Patented Apr. 25, 1933

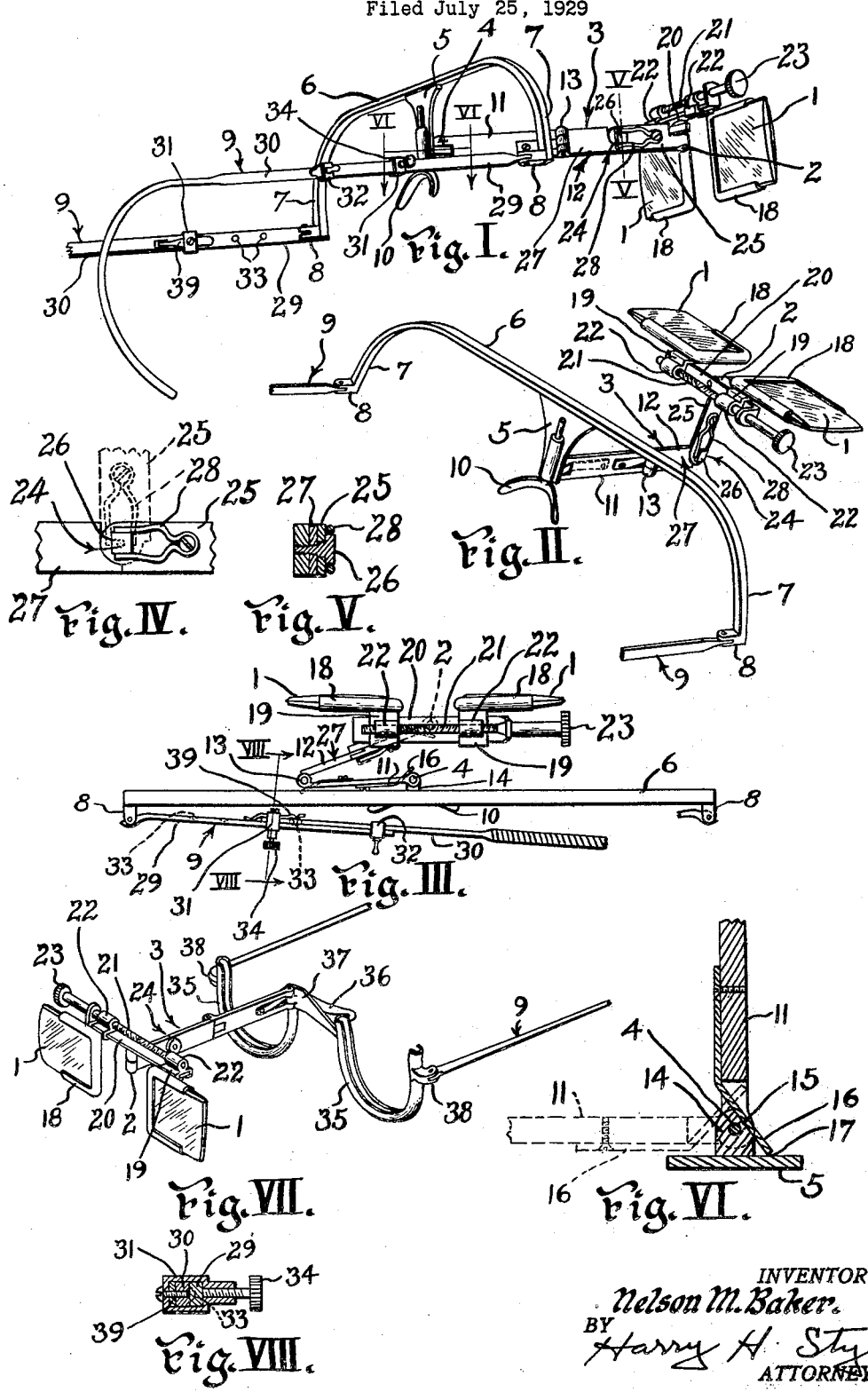

1,905,675

UNITED STATES PATENT OFFICE

NELSON M. BAKER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS

OPHTHALMIC MOUNTING

Application filed July 25, 1929. Serial No. 380,983.

This invention relates to ophthalmic mountings and has particular reference to improved holding means for lenses, especially auxiliary lenses.

The principal object of the invention is to provide a collapsible lens holding device which may be reduced to pocket or case size when not in use.

Another object of the invention is to provide improved means for moving the lenses into and out of line of direct vision without removing the mounting from the face.

Another object of the invention is to provide improved means for retaining the lens holding frame in position on the face.

Another object of the invention is to provide a binocular magnifier which may be used in combination with an ophthalmic mounting having prescription lenses.

Another object is to provide a folding lens support which will be firm and rigid when in open position.

Another object is to provide an improved adjustable temple for holding the device on the face of the wearer.

Another object is to provide simple, efficient and economical binocular magnifying means which may be quickly folded to pocket or case size when not in use and which, when opened for use, will rigidly support the lenses before the eyes of the wearer.

Other objects and advantages of the invention will become apparent from the following description taken in connection with the accompanying drawing, and it will be apparent that many changes may be made in the details of construction and arrangement of parts without departing from the spirit of the invention as expressed in the accompanying claims. I, therefore, do not wish to be limited to the exact details of construction and arrangements shown and described as the preferred forms only have been shown by way of illustration.

Referring to the drawing:

Fig. I is a perspective view of the preferred form of the invention showing the lenses positioned in line of vision;

Fig. II is a perspective view showing the lenses in raised position or out of line of vision;

Fig. III is a top or plan view showing the lens support partially folded;

Fig. IV is a fragmentary view of the means for holding the lenses in raised position;

Fig. V is a sectional view on line V—V of Fig. I;

Fig. VI is a sectional view on line VI—VI of Fig. I;

Fig. VII is a perspective view of a modified form of the invention;

Fig. VIII is a sectional view on line VIII—VIII of Fig. III.

To obtain proper focus and magnification with binocular magnifying lenses they must be held at a considerable distance from the eyes. In the past the supports for fixing this distance were mostly in the form of rigid arms which projected forwardly from a frame carried on the face. This device, although practical, was very inconvenient and cumbersome to carry about and was, therefore, limited in its scope and use. Another undesirable feature was that when being worn the lenses were always disposed in the direct field of vision and when ordinary vision was required the whole mounting had to be removed from the head, making it necessary to be continually removing and replacing the mounting.

It, therefore, is the prime object of this invention to obviate these difficulties by providing a collapsible magnifier support or support for other types of lenses which may be folded to pocket or case size when not in use and also to provide means whereby the lenses may be removed from and replaced in direct line of vision without removing the magnifier from the face.

Referring more particularly to the drawing wherein similar reference characters denote corresponding parts throughout, the invention comprises a pair of lenses 1 pivotally mounted at 2 to a collapsible arm 3. The said arm is pivoted at 4 to a downwardly projecting support 5 carried by a bar or frame member 6. The bar or frame member 6 is curved downwardly at 7 and is provided at its opposite ends with temple connections 8 for the temples 9. A suitable nose contacting member 10 mounted on the support 5 is adapted to cooperate with the temples 9 to support the mounting on the face of the wearer.

The arm 3 which supports the lenses 1 is formed of two sections 11 and 12 hinged centrally at 13. The said hinge connection in combination with the pivots 2 and 4 provides means whereby the lenses 1 may be folded toward or away from the frame member 6, as shown in Fig. III. The section 11 at the pivot connection 4 is secured to a lug 14 see Fig. VI, carried by the support 5. The said lug is formed with a flat face 15 adapted to coact with a spring 16 carried by the section 11 to hold the arm 3 rigid. The function of the flat faced lug 15 and spring 16 is similar to that of a jack-knife blade and spring. When the arm 3 is folded outwardly the lug and spring provide rigid means for holding the lenses 1 in that position and also allow the arm 3 to be folded when desired. The end of the spring 16 is also adapted to contact with the support 5 at the point 17 to definitely locate the outward position of the arm 3 as shown in Fig. VI. The pivot connections 2, 4 and 13 are identical in construction and all function in a like manner to hold the parts of the mounting in their respective positions.

The lenses 1 supported by the arm 3 are removably held in three-sided frame members 18 carried by the slide members 19. The said slide members are slidably mounted on a bar member 20 and are moved longitudinally thereon by a right and left hand threaded rod 21. The rod 21 is threaded into threaded lugs 22 formed on the slides 19 and is adapted to cause the lenses 1 to move toward and away from each other simultaneously when the thumb piece 23 is rotated.

The bar member 20 is pivoted at 2 to the collapsible arm 3 and may be folded toward and substantially parallel with the frame 6 as shown in Fig. III. Intermediate the pivot connections 2 and 13 of the section 12 is provided a hinge joint 24, as shown in Figs. II, IV and V, through which the lenses 1 may be moved into and out of line of direct vision. The hinge joint 24 is formed by pivoting the portion 25 of the section 12 on a square-headed lug 26 carried by the portion 27. The square-headed lug 26 projects outwardly between the fork of a U-shaped spring 28 carried by the portion 25 as shown in Figs. IV and V. The U-shaped spring 28 is adapted to engage the flat sides of the head 26 to hold the section 25 together with the lenses 1 in either raised or lowered position.

The temples 9 are formed of two sections 29 and 30 slidably mounted on each other through the slide clips 31 and 32 to increase or decrease the length of the temple. The clip member 31 is carried by the section 30 and is provided with a spring member 39 adapted to engage spaced locating recesses 33 formed in the section 29 to aid in obtaining definite lengths of temples. The clip member 31 is also provided with a set screw 34 for locking the sections 29 and 30 together to permanently fix the length of temple after the said temple has been adjusted.

The frame 6 is formed with a high, straight bar portion having downwardly curved side portions 7 to allow clearance to permit the use of the device in combination with an ophthalmic mounting having prescription lenses. The shape of the frame 6 allows the device to be placed over the frame of the ophthalmic mounting.

In Fig. VII there is shown a slight modification wherein instead of making the lens support 6 in the form of a straight bar member, a pair of semi-circular lens cells 35 are employed. The said cells are joined centrally by a bridge member 36 and a cross support 37 to which the lens support arm 3 is secured. The cells 35 are provided with the usual temple connections 38 for the temples 9 and are so constructed that prescription lenses or the like may be quickly inserted therein for use in combination with the magnifying or other lenses 1. The arm 3 and slide support 20 in this construction are identical with the previously described construction and are capable of similar adjustments.

The outstanding feature of the invention is the provision of the collapsible arm 3 which may be folded on its spring pivots 2, 4 and 13, as shown in Fig. III, to reduce the device to pocket or case size and which when brought into use may be moved outwardly a predetermined amount, at which point it automatically locks to hold the lenses 1 rigidly in working position. It also is provided with the spring hinge joint 24 through which the lenses 1 may be moved into and out of line of direct vision without removing the mounting from the face. The spring hinge arrangement 24 automatically locks the lenses 1 either in raised or lowered position, as shown in Fig. IV.

While the device as shown and described as a binocular magnifying instrument, it is clear that it may be used for other purposes with other types of lenses, such as for instance, colored lenses for protecting the eye from glare, etc.

From the foregoing description it will be seen that I have provided simple, efficient and economical means of producing a collapsible device which may be folded to pocket or case size, and in which the lenses may be moved into or out of line of direct vision without removing the mounting from the face of the wearer.

Having described my invention, I claim:

1. In a device of the character described, a frame member having a nose rest support thereon, an arm pivoted to the nose rest support and extending forwardly therefrom, a lens support pivoted adjacent the outer end of said arm, a hinge joint on the arm intermediate the pivot connections by means of which the said arm may be folded, and a spring member at said hinge joint and pivot connections adapted to hold the lens support rigid in its outwardly adjusted position.

2. In a device of the character described, a frame member having a nose rest support, an arm pivoted to the nose rest support and extending forwardly therefrom, a lens support pivoted adjacent the outer end of said arm, a hinge joint on the arm intermediate the pivot connection of the nose rest support and lens support and a pivot connection on the arm between the hinge joint and lens support by means of which the said lens support may be moved into and out of line of direct vision.

3. In a device of the character described, a frame member having a forwardly extending arm, a pair of lens supports secured adjacent the end of said arm and a substantially horizontal pivot connection intermediate its ends on which the lens supports may be moved vertically into and out of line of direct vision.

4. In a device of the character described, a frame member having a forwardly extending arm, a pair of lens supports secured adjacent the end of said arm, a pivot connection intermediate the ends of said arm on which the lens supports may be moved into and out of line of direct vision, and resilient means at the pivot connection for holding the lens supports in adjusted position.

5. In a device of the character described, a bar frame member having a downwardly extending nose rest support centrally located thereon and temple connections adjacent its ends, an arm pivoted to the downwardly extending nose rest support and extending forwardly therefrom, a pair of lens frames pivotally secured adjacent the outer end of the arm, and a hinge joint on the arm intermediate its ends by means of which the lenses may be moved toward or away from the bar frame member.

NELSON M. BAKER.